(12) United States Patent
Nishida et al.

(10) Patent No.: US 9,248,879 B2
(45) Date of Patent: Feb. 2, 2016

(54) FUEL TANK MOUNTING STRUCTURE OF SADDLE-RIDE-TYPE VEHICLE

(71) Applicant: HONDA MOTOR CO., LTD., Tokyo (JP)

(72) Inventors: Yoichi Nishida, Wako (JP); Mitsuya Kawamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/471,528

(22) Filed: Aug. 28, 2014

(65) Prior Publication Data

US 2015/0059423 A1    Mar. 5, 2015

(30) Foreign Application Priority Data

Aug. 30, 2013   (JP) ................. 2013-180733

(51) Int. Cl.
*B60P 3/22* (2006.01)
*B62J 35/00* (2006.01)

(52) U.S. Cl.
CPC .............. *B62J 35/00* (2013.01); *Y10T 70/5969* (2015.04)

(58) Field of Classification Search
CPC ........................................................ B62J 35/00
USPC ................................................ 280/833, 835
See application file for complete search history.

(56) References Cited

U.S. PATENT DOCUMENTS

| | | | |
|---|---|---|---|
| 6,213,514 B1 * | 4/2001 | Natsume et al. | 280/833 |
| 6,691,962 B1 * | 2/2004 | Krejci | 248/214 |
| 6,910,716 B2 * | 6/2005 | Kurayoshi et al. | 280/835 |
| 7,410,191 B2 * | 8/2008 | Karube et al. | 280/833 |
| 8,038,172 B2 * | 10/2011 | Morikawa | 280/833 |

FOREIGN PATENT DOCUMENTS

| | | |
|---|---|---|
| JP | 56-155983 U | 11/1981 |
| JP | 62-076791 U | 5/1987 |
| JP | 1-175988 U | 12/1989 |
| JP | 2013-124078 * | 6/2013 |

* cited by examiner

*Primary Examiner* — Anne Marie Boehler
*Assistant Examiner* — Marlon Arce
(74) *Attorney, Agent, or Firm* — Rankin, Hill & Clark LLP (57) ABSTRACT

A cushion rubber provided independent from a flange of a fuel tank. A fuel tank is arranged above a main frame. A tank front stay, which is mounted on a front lower portion of the fuel tank, is made to overlap with a tank-front-side mounting boss, which is formed on a front end bent portion of the main frame, and is fastened to the tank-front-side mounting boss using a bolt from sideward. The tank front stay is provided independently from a flange, is welded to a bottom surface of the fuel tank, and projects downward from the inside of the flange. A sleeve portion is mounted on a lower end of the tank front stay, and a mount rubber is inserted into the sleeve portion thus providing a rubber mount.

15 Claims, 9 Drawing Sheets

FUEL TANK MOUNTING STRUCTURE OF SADDLE-RIDE-TYPE VEHICLE

BACKGROUND OF THE INVENTION

1. Field of the Invention

The present invention relates to a fuel tank mounting structure of a saddle-ride-type vehicle, and more particularly to a mounting structure arranged on a front side of a fuel tank.

2. Description of Related Art

There has been known a fuel tank mounting structure where a fuel tank is supported on a main frame which constitutes a vehicle body frame, a bracket is mounted on a front end portion of the fuel tank, the bracket is fixed to the vehicle body frame from above using bolts, a buffer member is mounted in a hole formed in a flange portion which is mounted on a lower portion of a side portion of the fuel tank in a downwardly extending manner, and an upper surface of the buffer member is brought into contact with a bottom surface of the fuel tank and a lower surface of the buffer member is brought into contact with an upper surface of the main frame (see JP-A-2013-124078).

In the structure where the buffer member is mounted on the flange as in the case of the above-mentioned JP-A-2013-124078, it is necessary to position the flange on the upper surface of the main frame such that the buffer member overlaps with the main frame. Accordingly, to align the position of the flange with the upper surface of the main frame, a shape of the fuel tank is restricted. Further, the buffer member is also required to satisfy the particular arrangement relationship with the upper surface of the main frame and hence, the arrangement of the buffer member is restricted. Still further, the buffer member is mounted on the flange by forming the hole in the flange and by engaging the buffer member with the hole from a side and hence, the hole formed in the flange and an engaging portion of the buffer member are observed from the outside unless no measure is taken whereby the structure influences the appearance of a vehicle. A particular cover becomes necessary to conceal the hole formed in the flange and the engaging portion of the buffer member. The invention has been made to overcome these drawbacks.

SUMMARY OF THE INVENTION

To overcome the above-mentioned drawbacks, the present invention provides a fuel tank mounting structure of a saddle-ride-type vehicle which includes: a vehicle body frame having a head pipe that steerably supports a front wheel and a main frame extending obliquely downward and rearward from the head pipe; an engine supported below the main frame; a fuel tank supported above the main frame; and a straddling-type seat arranged behind the fuel tank, wherein the fuel tank includes a connecting member mounted on the fuel tank in a state where the connecting member extends toward left and right outer side surfaces of the main frame from a bottom surface, and the connecting member overlaps with the main frame as viewed in a top plan view, and a buffer member, which is brought into contact with an upper surface of the main frame, is arranged at a position where the connecting member and the main frame overlap with each other. Hence, unlike the prior art where the buffer member is mounted on the flange, it is possible to mount the buffer member independently from the flange. Accordingly, the restriction imposed on the shape of the tank and the mounting position of the buffer member is eliminated. Further, because it is unnecessary to form a hole in the flange portion for mounting the buffer member, an adverse influence on the appearance of a vehicle can be prevented from being exerted, and it is unnecessary to additionally provide a cover in order to cover the mounting hole.

In further accordance with the present invention, the fuel tank is formed by joining an outer member, which constitutes an outer surface, and an inner member, which constitutes the bottom surface, to each other by a flange portion extending along an outer peripheral portion of the fuel tank, and the flange portion has at least a portion thereof arranged outside the main frame in the vehicle width direction as viewed in a top plan view, and the connecting member having the buffer member is mounted on the inner member at a position where the flange extends outside the main frame. Hence, the buffer member is arranged inside the flange whereby a possibility that the buffer member and the flange interfere with each other is eliminated thus facilitating the arrangement of the buffer member.

In further accordance with the present invention, the buffer member is arranged more inside in the vehicle width direction than a mounting portion of the connecting member, which is mounted on the main frame. Hence, the buffer member is arranged inside the flange as well as inside the connecting member whereby the buffer member is hardly observed from the outside thus enhancing the appearance of the vehicle.

In further accordance with the present invention, a mounting hole, which opens in the vehicle width direction, is formed in a mounting portion of the connecting member, which is mounted on the main frame, and the connecting member is fastened to the main frame by way of a mount rubber inserted into the mounting hole. Hence, the connecting member can be fastened to the main frame in the lateral direction. In such fastening, the connecting member is supported on the upper surface of the main frame by way of the buffer member and hence, there is no possibility that the fuel tank is displaced downward at the time of fastening so that the fastening of the fastening member such as a bolt becomes difficult. As a result, the fastening operation can be easily performed from the lateral direction of the vehicle and hence, operability can be enhanced.

In further accordance with the present invention, a key cylinder, which operates a main switch and a handle lock, is provided above and behind the head pipe, a recessed portion, which stores the key cylinder, is formed at the center of a front end portion of the fuel tank in the vehicle width direction, and the connecting member is provided on left and right sides of the recessed portion. Accordingly, the key cylinder can be arranged at the center position in the vehicle width direction which a rider in a seated state can easily observe and hence, the rider can perform a key operation at a position which the rider can easily reach. Particularly, the key operation of the rider is facilitated in a vehicle having a layout where the rider is seated at a position close to a rear side of the vehicle particularly.

DETAILED DESCRIPTION OF THE INVENTION

Figure 1:
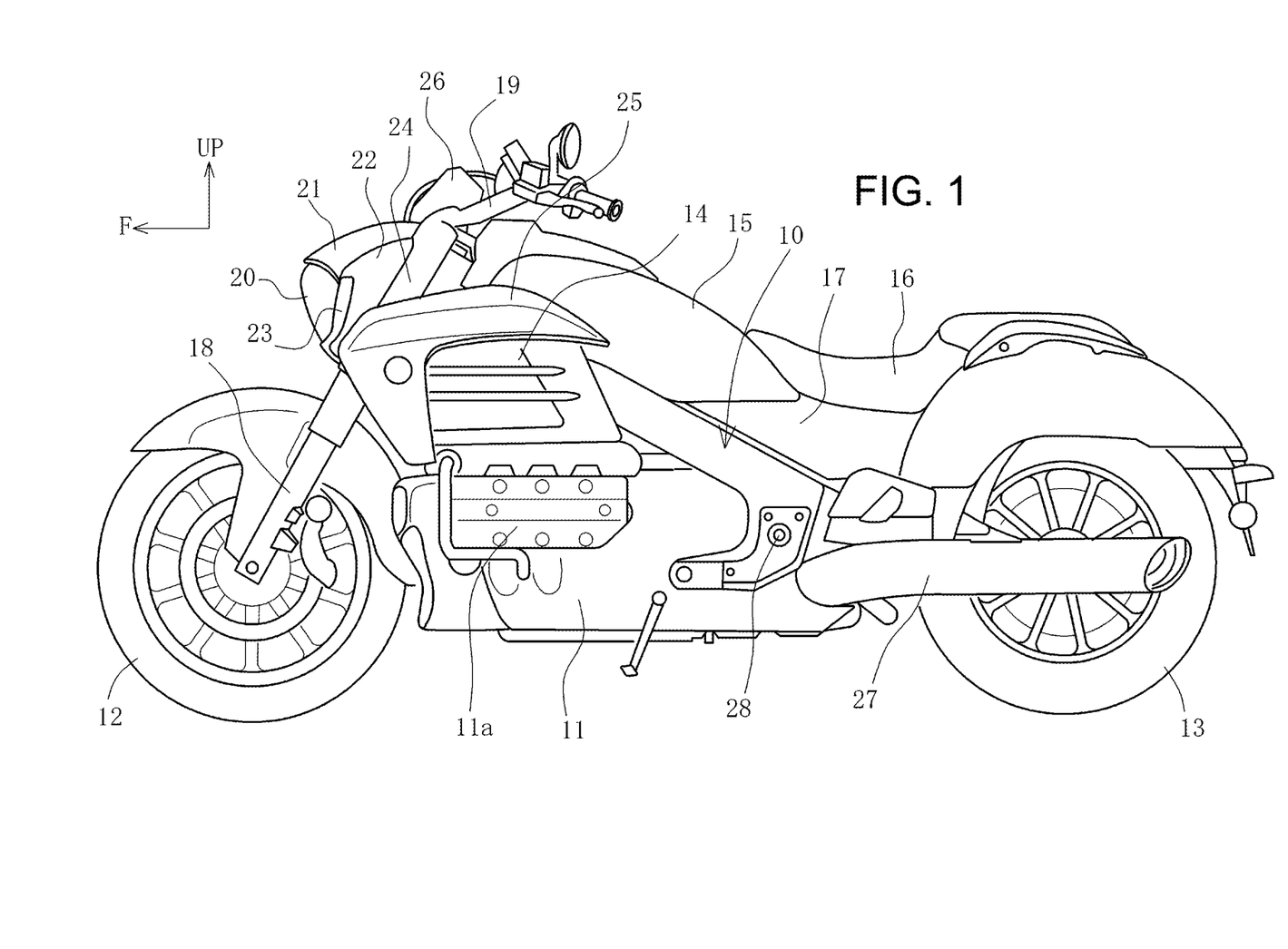
FIG. 1 is a left side view of a vehicle according to an embodiment.
Figure 2:
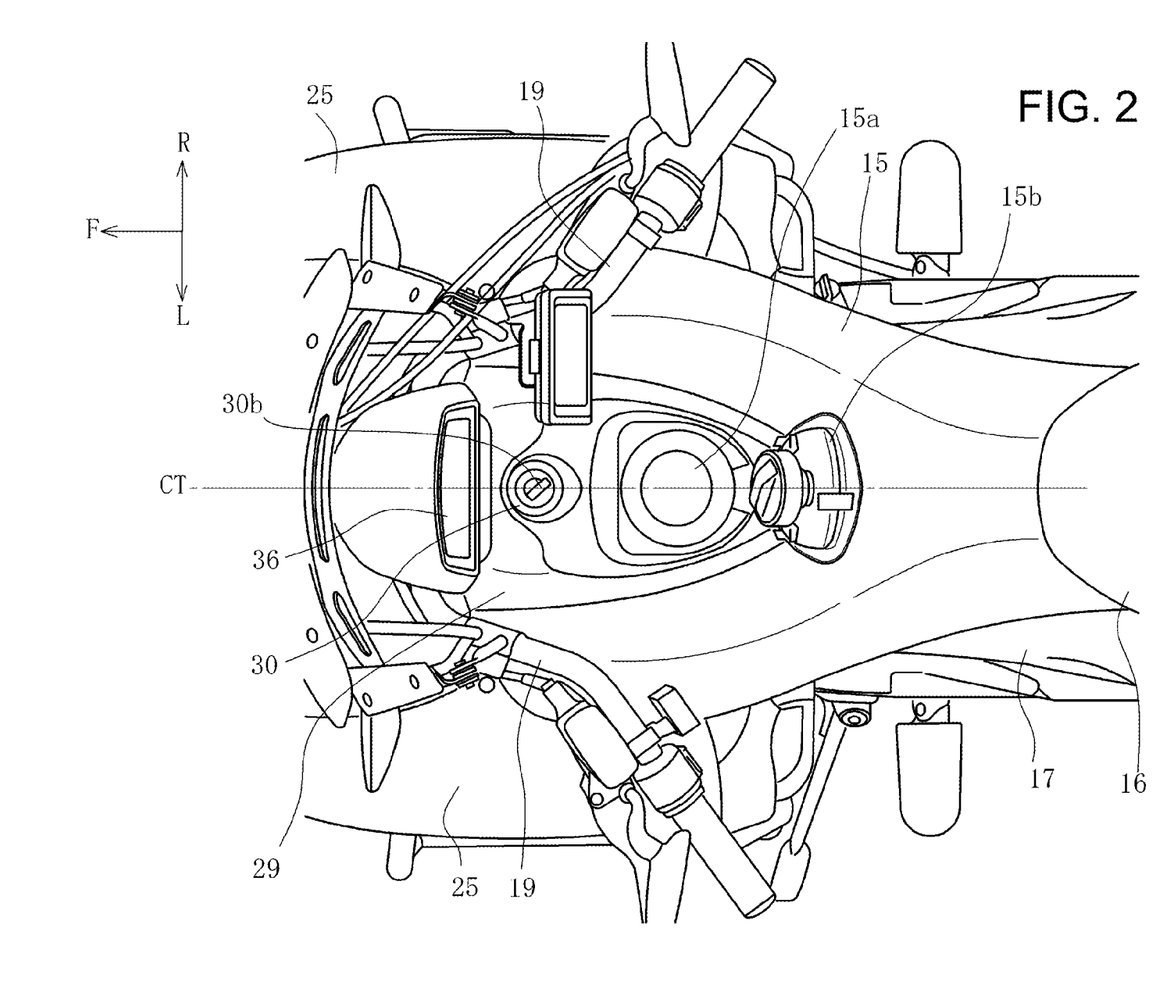
FIG. 2 is a plan view showing a fuel tank and an area around the fuel tank shown in FIG. 1.

Hereinafter, one embodiment is explained by reference to drawings. Firstly, the overall constitution of a vehicle is schematically explained by reference to FIG. 1. In this specification, the directions such as frontward and rearward, upward and downward, and leftward and rightward are determined based on respective directions of the vehicle. In FIG. 1, a front side of the vehicle is indicated by an arrow F, and an upper side of the vehicle is indicated by an arrow UP. In FIG. 2, a left side of the vehicle is indicated by an arrow L, and a right side of the vehicle is indicated by an arrow R.

A motorcycle shown in FIG. 1 is a big motorcycle where a horizontally-opposed cylinder engine 11 is supported on a lower side of a vehicle body frame 10 at the center of a vehicle body, and a front wheel 12 and a rear wheel 13 are arranged in front of and behind the vehicle body frame 10 respectively. The engine 11 is a water-cooled engine, and radiators 14 are arranged above a cylinder head 11a of the engine 11. Although not clearly shown in FIG. 1, radiators 14 are arranged on left and right sides of the vehicle body, respectively.

A fuel tank 15 is supported on the vehicle body frame 10 above the engine 11. A front portion of the fuel tank 15 overlaps with inner sides of the radiator 14 as viewed in a side view. A tandem seat 16 is arranged behind the fuel tank 15, and is supported on seat rails, described later, and a pillion seat is positioned above the rear wheel 13.

A front end of a rider's seat, which constitutes a front portion of the seat 16, overlaps with an upper surface of a rear portion of the fuel tank 15. A lower portion of a rear portion of the fuel tank 15 and a lower portion of the rider's seat of the seat 16 are covered with side covers 17. Each side cover 17 covers a side surface of the vehicle body in such a manner that the side cover 17 extends from a lower edge of the seat 16 to a lower edge of the fuel tank 15, and these lower edges and upper edges of a main frame 32 and a center frame 34 (both described later), which constitute the vehicle body frame 10, are connected to each other by a downwardly spreading surface.

Although not shown in the drawing, legs of a rider extend frontward from the seat 16, and are bent and extend downwardly from an area in the vicinity of the rear portion of the fuel tank 15. Thighs of the legs extend frontward toward side surfaces of the rear portions of the fuel tank 15 from the seat 16, and are brought into contact with front surfaces of the side covers 17 and the side surfaces of the rear portions of the fuel tank 15. The rider can perform knee-gripping by clamping such portions with his thighs. The downwardly spreading surface of the side cover 17 has a shape which conforms to the thigh.

Numeral 18 indicates a front fork. The front fork 18 is provided as left and right front forks, and the front wheel 12 is supported on lower end portions of the front forks 18. Numeral 19 indicates a handle bar, and the handle bar 19 steers the front wheel 12 by rotating the front forks 18. Numeral 20 indicates a head light, and numeral 21 indicates a head light cowl. A duct 22 is integrally formed on left and right sides of the head light cowl 21 respectively (only left duct 22 shown in the drawing), and introducing openings 23 are formed on front surfaces of the ducts 22 in a state where the introducing openings 23 are directed in the frontward direction.

The ducts 22 are integrally formed with a fork cover 24, which covers upper portions of the front forks 18.

Numeral 25 indicates radiator shrouds, and the radiator shrouds 25 cover front portions and upper portions of the radiators 14 in an approximately inverted L-shape as viewed in a side view. Upper portions of the radiator shrouds 25 extend in the rearward and approximately horizontal direction, and cover side surfaces of a front lower portion of the fuel tank 15. Numeral 26 indicates a meter.

The engine 11 takes in air from an air cleaner described later, which is arranged below the fuel tank 15, and discharges air from a muffler 27, which is arranged on one side of the rear wheel 13 approximately horizontally. The rear wheel 13 is driven by the engine 11 by way of a shaft. A swing arm (not shown), which supports the rear wheel 13 on a rear end thereof, is swingably supported on the vehicle body frame 10 by a pivot 28.

FIG. 2 is a plan view showing the fuel tank 15 and an area around the fuel tank 15 shown in FIG. 1. A front portion of the fuel tank 15 expands in the lateral direction and a width of a rear portion of the fuel tank 15 is narrowed thus providing the fuel tank 15 with a shape that enables a rider to perform knee-gripping. A garnish 29 extending in the longitudinal direction of the vehicle is mounted on a center portion of the front portion of the fuel tank 15 which has a large width in such a manner that the garnish 29 surrounds a filling port 15a, and a key cylinder 30 is mounted on a portion of the front portion of the fuel tank 15 in front of the filling port 15a.

Figure 4:
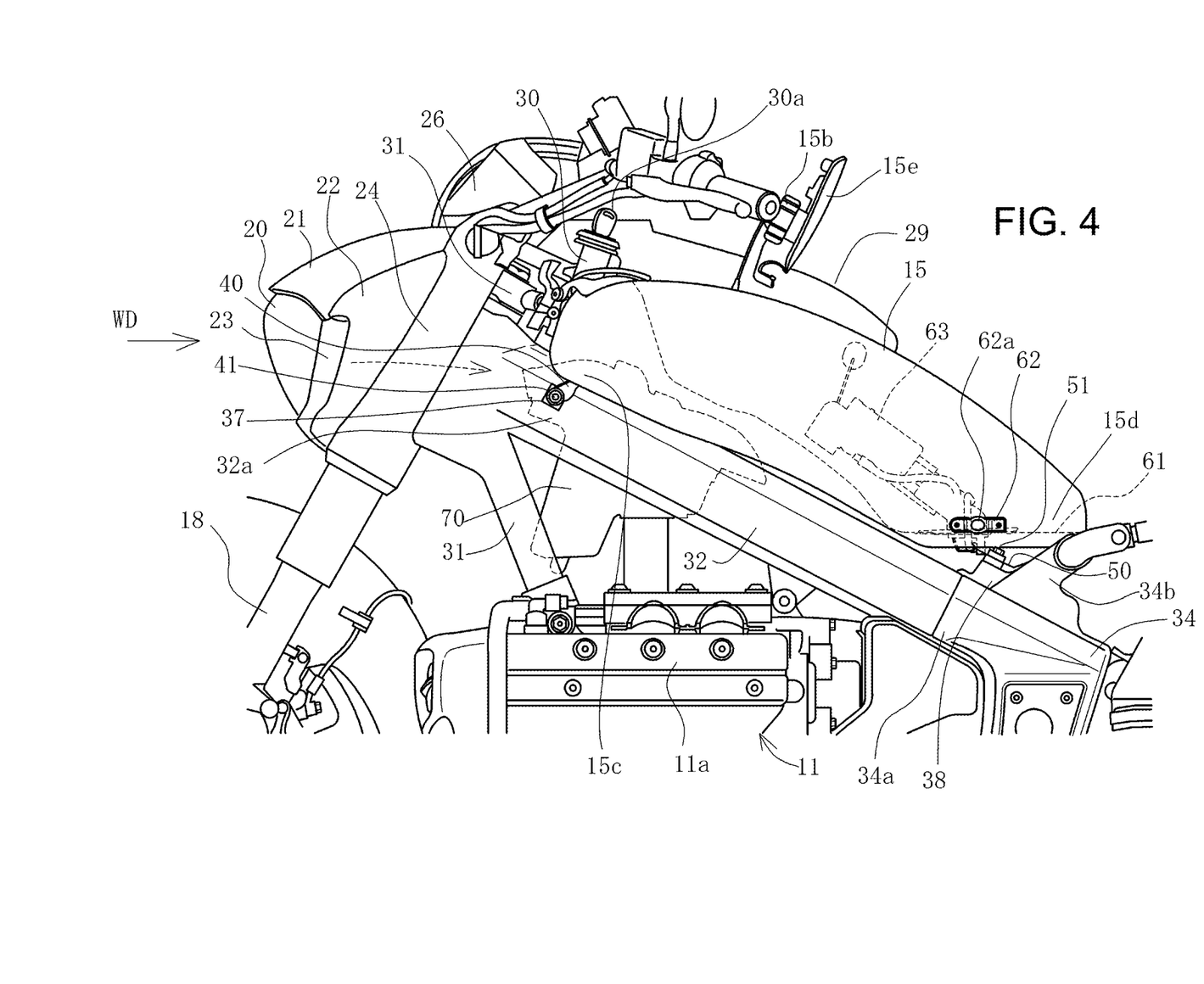
FIG. 4 is a view showing the fuel tank and an area around the fuel tank shown in FIG. 1 in a state where some parts are omitted.

The key cylinder 30 is a main switch for starting or stopping the engine 11, and also functions as a handle lock. The filling port 15a is opened or closed by a cap 15b. FIG. 2 and FIG. 4 respectively show a state where a lid 15e is opened and the removed cap 15b is temporarily placed on a back side of the lid 15e.

The key cylinder 30 is positioned at a front end portion of the fuel tank 15, and is arranged at a position where a rider's hand can easily reach the key cylinder 30 in a state where the rider is seated on the seat 16. The meter 26 is positioned in front of the key cylinder 30, and the meter 26, the key cylinder 30 and the filling port 15a are aligned with each other on the center line CT of the vehicle body.

Figure 3:
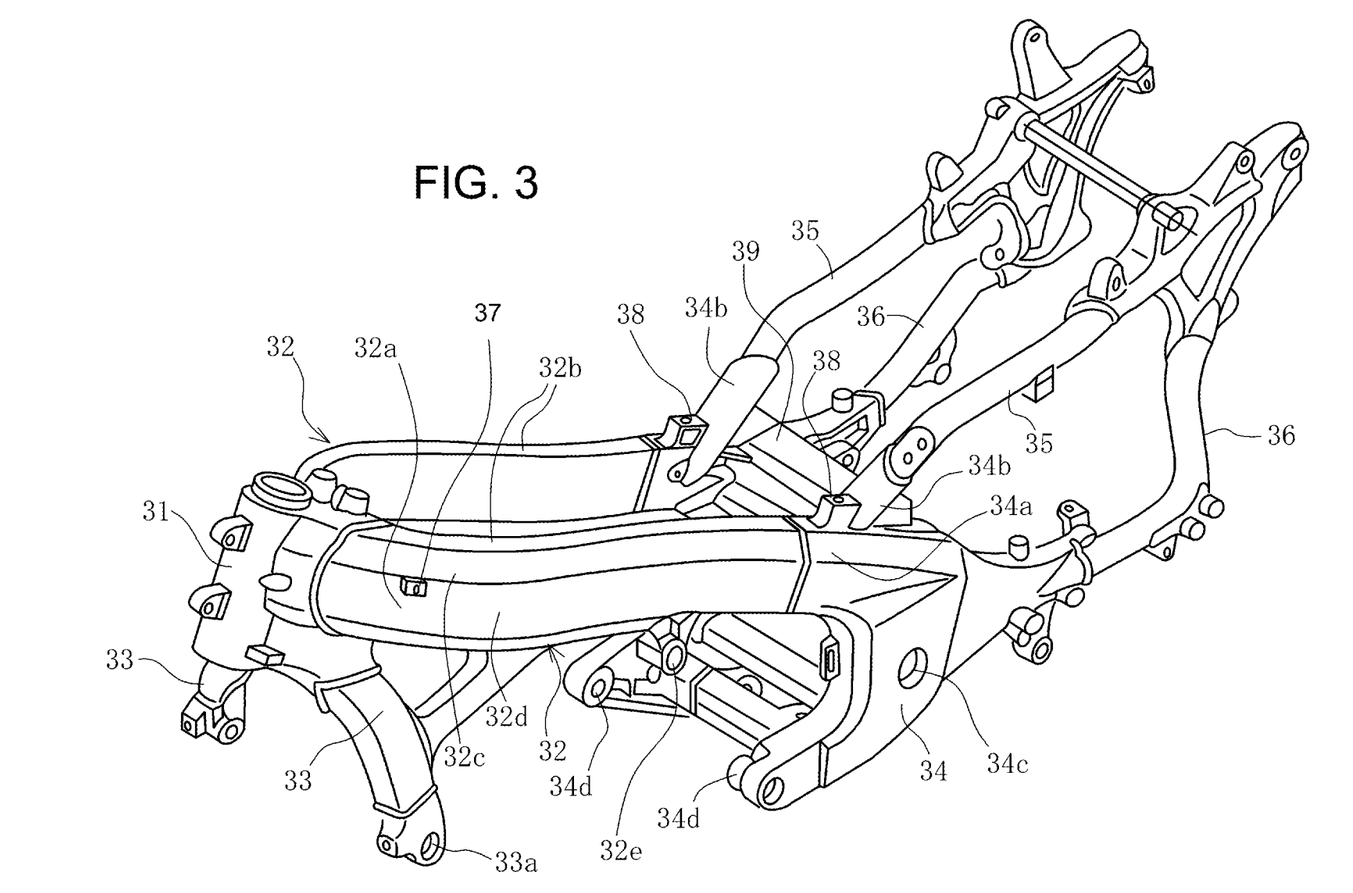
FIG. 3 is a perspective view of a vehicle body frame.

FIG. 3 is a perspective view showing the vehicle body frame 10. The vehicle body frame 10 includes: main frames 32 that extend obliquely downward and rearward in a laterally bifurcated manner from the head pipe 31 mounted on a front end portion of the vehicle body frame 10; down frames 33 that extend obliquely downward and rearward from the head pipe 31 in the same manner as the main frames 32 at a steeper angle than the main frame 32; center frames 34 that are joined by welding to rear end portions of the main frames 32; seat rails 35 that extend obliquely upward and rearward from upper portions of the center frames 34; and rear frames 36 that connect rear portions of the center frames 34 and rear ends of the seat rails 35 to each other.

The respective members, which constitute the vehicle body frame 10, are made of metal such as an aluminum alloy, and each member is formed as left and right members except for the head pipe 31. The head pipe 31, the main frames 32, the down frames 33, the seat rails 35 and the rear frames 36 have the hollow pipe structure respectively.

Tank-front-side mounting bosses 37 are formed on side surfaces of front end bent portions 32a, which are formed on front portions of the main frames 32, respectively, in a state where the tank-front-side mounting bosses 37 are bent toward the head pipe 31. Tank-rear-side mounting bosses 38 are formed on upper surfaces of upper front ends 34a of the center frames 34, respectively.

Joint portions 34b, which project obliquely upward and to which front end portions of the seat rails 35 are connected, are integrally formed with the center frames 34 in the vicinity of the tank-rear-side mounting bosses 38. Rear portions of the joint portions 34b of the left and right center frames 34 are connected to each other by a cross member 39. An upper end portion of a buffer for a rear wheel suspension (not shown) is supported on the cross member 39.

The left and right tank-rear-side mounting bosses 38 are arranged in front of the cross member 39, and a member that traverses in the vehicle width direction like the cross member is not provided between the left and right tank-rear-side mounting bosses 38.

Numeral 34c indicates pivot holes, and the pivot 28 (FIG. 1) is inserted into the pivot holes 34c.

The engine 11 is supported by bosses 33a formed on lower end portions of the down frames 33, bosses 32e formed on intermediate portions of the main frames 32 in the longitudinal direction of the vehicle, and bosses 34d formed on front ends of lower portions of the center frames 34.

Next, the structure of the fuel tank 15 and an area around the fuel tank 15 is explained.

FIG. 4 shows the fuel tank 15 and an area around the fuel tank 15 shown in FIG. 1 in a state where the radiators 14, the radiator shrouds 25 and the side covers 17 are omitted.

The fuel tank 15 is arranged in an extending manner in the longitudinal direction of the vehicle obliquely upward and frontward along the inclination of the main frame 32 as viewed in a side view. A front portion and a rear portion of the fuel tank 15 are fastened to the main frame 32 and the center frame 34, respectively. The front lower portion 15c of the fuel tank 15 overlaps with outer sides of the front end bent portions 32a of the main frames 32. Lower end portions of tank front stays 40 (corresponding to connecting members of the invention), which extend obliquely downward and frontward from a bottom portion of the fuel tank 15, are made to overlap with the tank-front-side mounting bosses 37, and are fastened to the main frames 32 using bolts 41 from lateral sides of the vehicle.

A rear lower portion 15d of the fuel tank 15 is fastened to the tank-rear-side mounting bosses 38 in such a manner that a tank rear stay 50, which extends downward from the rear lower portion 15d of the fuel tank 15, is made to overlap with and is fastened to the tank-rear-side mounting bosses 38 using bolts 51 from above.

With respect to the bottom surface 60 of the fuel tank 15, the bottom surface of the rear lower portion 15d forms an approximately horizontal pump mounting seat surface 61. The tank rear stay 50 projects sideward from the pump mounting seat surface 61, and is fastened to the tank-rear-side mounting bosses 38 using the bolts 51 from above. The tank-rear-side mounting bosses 38 are positioned below the pump mounting seat surface 61. The joint portions 34b are also formed in an upwardly projecting manner while expanding laterally outward from lower portions thereof so as avoid the pump mounting seat surface 61.

Side cover mounting brackets 62 are mounted on side surfaces of the rear lower portion 15d. Engaging projections (not shown), which are formed on inner surfaces of the upper portions of the front ends of the side covers 17 in an inwardly projecting manner, are detachably engaged with elongated holes 62a, which are formed in center portions of the side cover mounting brackets 62 and extend in the longitudinal direction of the vehicle. These engaging portions adopt the rubber mount structure where the engaging projection is engaged with the elongated hole 62a by way of a cylindrical rubber.

A portion of the bottom surface 60 in front of the pump mounting seat surface 61 has an upwardly inclined bottom shape, which is inclined at a steep angle toward the filling port 15a formed in the front portion of the fuel tank 15. A fuel pump 63 is incorporated in the fuel tank 15 such that the fuel pump 63 obliquely extends in the longitudinal direction of the vehicle along the bottom surface 60. A lower (rear) end portion of the fuel pump 63 is mounted on the pump mounting seat surface 61.

The ducts 22 are arranged so as to overlap with outer sides of the head pipe 31. A traveling wind WD, which is taken into the ducts 22 through the introducing openings 23, passes along inner sides of the front forks 18 and is supplied to a front side of the front lower portion 15c of the fuel tank 15 and an upper side of the cylinder head 11a.

Figure 5:
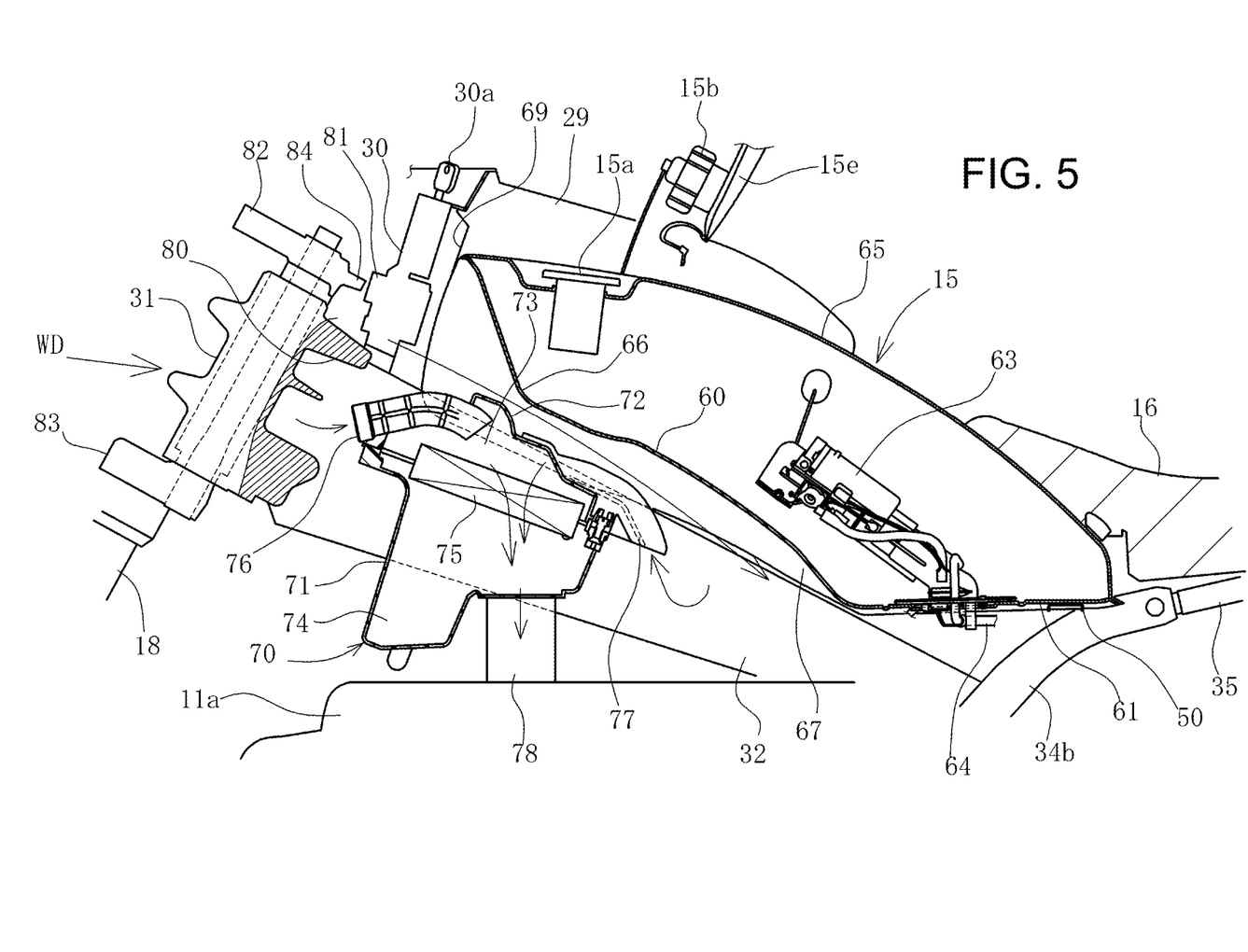
FIG. 5 is a cross-sectional view of a portion of the vehicle corresponding to FIG. 4 taken along a line which passes a center line of a vehicle body.

FIG. 5 is a cross-sectional view showing a portion of the vehicle corresponding to FIG. 4 taken along a line which passes the center line CT of a vehicle body.

A large gap is formed between a front portion of the bottom surface 60 of the fuel tank 15 and the main frame 32, and an air cleaner 70 is arranged below the fuel tank 15 by making use of the gap.

The air cleaner 70 is housed in a space formed between a rear side of the head pipe 31 and the left and right main frames 32 and above the cylinder head 11a. The air cleaner 70 includes: a cleaner casing 71 that forms a lower side of the air cleaner 70; a cleaner cover 72 that forms an upper side of the air cleaner 70; and an air filter 75 that partitions the inside of the air cleaner 70 into a dirty side 73 and a clean side 74. A front duct 76, which extends obliquely downward and frontward, is formed on the cleaner cover 72. The front duct 76 takes in a traveling wind WD from behind the head pipe 31, and introduces the traveling wind WD into the dirty side 73.

A rear duct 77, which takes in air from a space behind the cleaner cover 72 toward the dirty side 73, is also provided to a rear portion of the cleaner cover 72.

The cleaner casing 71 is arranged in a rearwardly inclined posture in conformity with the inclination of the bottom surface 60, and the cleaner casing 71 opens at a position lower than the front duct 76.

Air that enters the dirty side 73 is filtered by the air filter 75 and enters the clean side 74. Then, air is taken in an intake port of the cylinder head 11a by way of an intake pipe 78 connected to a bottom portion of the cleaner casing 71.

The bottom surface 60 of the fuel tank 15 is inclined obliquely upward and frontward and hence, the bottom surface 60 of the fuel tank 15 functions as a guide portion that guides a traveling wind WD introduced through the introducing opening 23 toward an area around the cleaner casing 71 and toward a rear lower portion 15d side behind the cleaner casing 71. The bottom surface 60 has a guide shape. Due to such a constitution, it is possible to supply a large amount of cold traveling wind WD to the front duct 76 and the rear duct 77 and, at the same time, it is also possible to cool the fuel tank 15 per se and hence, a relatively cooled fuel can be supplied to the cylinder head 11a whereby the power performance of the engine can be enhanced.

The key cylinder 30 mounted on the front end portion of the fuel tank 15 is arranged in a vertically elongated manner in a state where an upper side of the key cylinder 30 is rearwardly inclined.

The key cylinder 30 is supported on a projecting portion 80 that rearwardly extends from an upper portion of the head pipe 31, and a lock portion 81 is configured to be engaged with or disengaged from a stopper portion 84 formed on a top bridge 82 when a key 30*a* is operated.

The key 30*a* is inserted into a key hole 30*b* (FIG. 2) formed in an upper end surface of the key cylinder 30 from above, and the lock portion 81 is advanced or retracted in response to the rotation of the key 30*a*. The stopper portion 84 is rotated integrally with the handle bar 19 and hence, when the rotation of the stopper portion 84 is restricted by the lock portion 81, the handle bar 19 is brought into a non-rotatable state whereby a handle lock state is established.

A front portion of the top bridge 82, together with a front portion of the bottom bridge 83, connects upper portions of the front forks 18 with each other. A rear portion of the top bridge 82 and a rear portion of the bottom bridge 83 are made to overlap with an upper portion and a lower portion of the head pipe 31 and are rotatably connected to the head pipe 31 by the steering shaft 85.

The pump mounting seat surface 61 forms an approximately triangular space as viewed in a side view together with an upper portion of the center frame 34 and the joint portion 34*b*. A pipe 64 of the fuel pump 63 is arranged in the space and below the pump mounting seat surface 61.

The pipe 64 of the fuel pump 63 and wiring extend downward from the pump mounting seat surface 61. There is neither a cross member for mounting nor a shaft for mounting that traverses in the lateral direction below the pump mounting seat surface 61 and hence, the pump mounting seat surface 61 can be arranged at a lower position thus contributing to lowering of the center of gravity of the vehicle.

Figure 6:
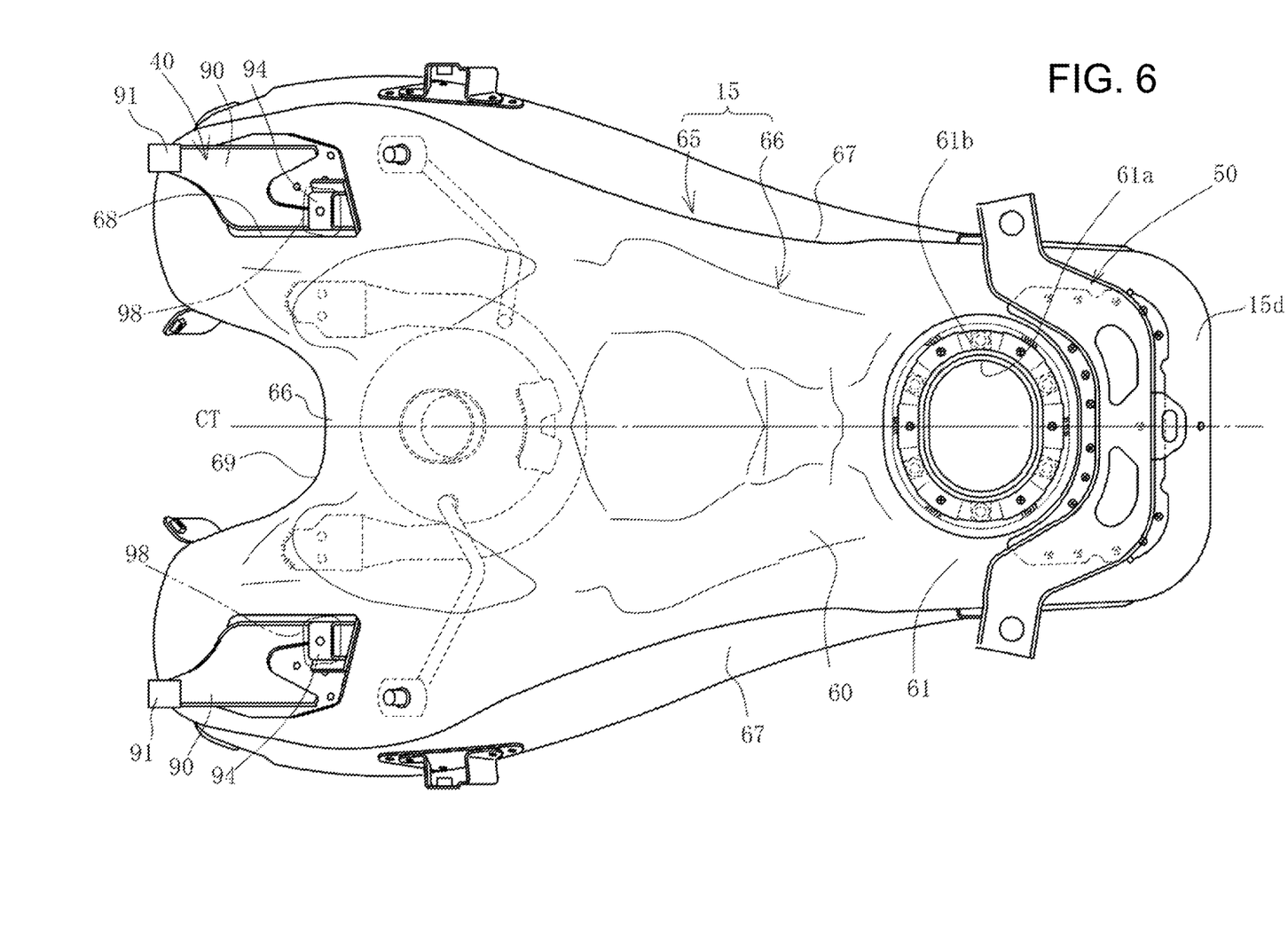
FIG. 6 is a bottom plan view of the fuel tank.

Next, the mounting structure of the front portion of the fuel tank 15 is explained in detail. FIG. 6 is a bottom plan view of the fuel tank 15. The fuel tank 15 is a hollow body formed by joining an outer member 65, which forms an upper surface side of the fuel tank 15, and an inner member, 66 which forms a bottom surface side of the fuel tank 15, in an opposedly facing manner, wherein the periphery of the outer member 65 and the periphery of the inner member 66 are integrally joined to each other by welding using a flange 67. The flange 67 has a vertical flange shape that projects downward. A portion of the flange 67 that corresponds to the front lower portion 15*c* projects more outward than the front end bent portions 32*a* of the main frames 32 in a state where the fuel tank 15 is supported on the main frames 32 (see FIG. 4). The tank front stays (connecting member) 40 having a cushion rubber (buffer member) 98 is mounted on the inner member 66 at a position where the flange 67 extends outside the main frame 32.

Mounting seats 68 for mounting the tank front stays 40 are formed on left and right front end portions of the bottom surface 60, and the tank front stays 40 are integrally formed with the mounting seats 68 by welding. A center portion of the fuel tank 15 between the left and right mounting seats 68 is indented in a bent shape toward a rear side from a front side in the longitudinal direction of the vehicle thus forming a recessed portion 69. The key cylinder 30 is arranged in the inside of the recessed portion 69.

On the pump mounting seat surface 61 formed on the rear portion of the bottom surface 60 of the fuel tank 15, a pump mounting seat 61*b* is formed. The pump mounting seat 61*b* surrounds a pump insertion hole 61*a* formed in a center portion of the pump mounting seat surface 61 in the vehicle width direction. The fuel pump 63 is inserted into the fuel tank 15 through the pump insertion hole 61*a*, and is mounted on the pump mounting seat 61*b* by fastening a bottom portion of the fuel pump 63 to the pump mounting seat 61*b* using bolts.

The tank rear stay 50 is also welded to the pump mounting seat surface 61 behind the pump mounting seat 61*b*, and is arranged in an extending manner in the vehicle width direction.

Figure 7:
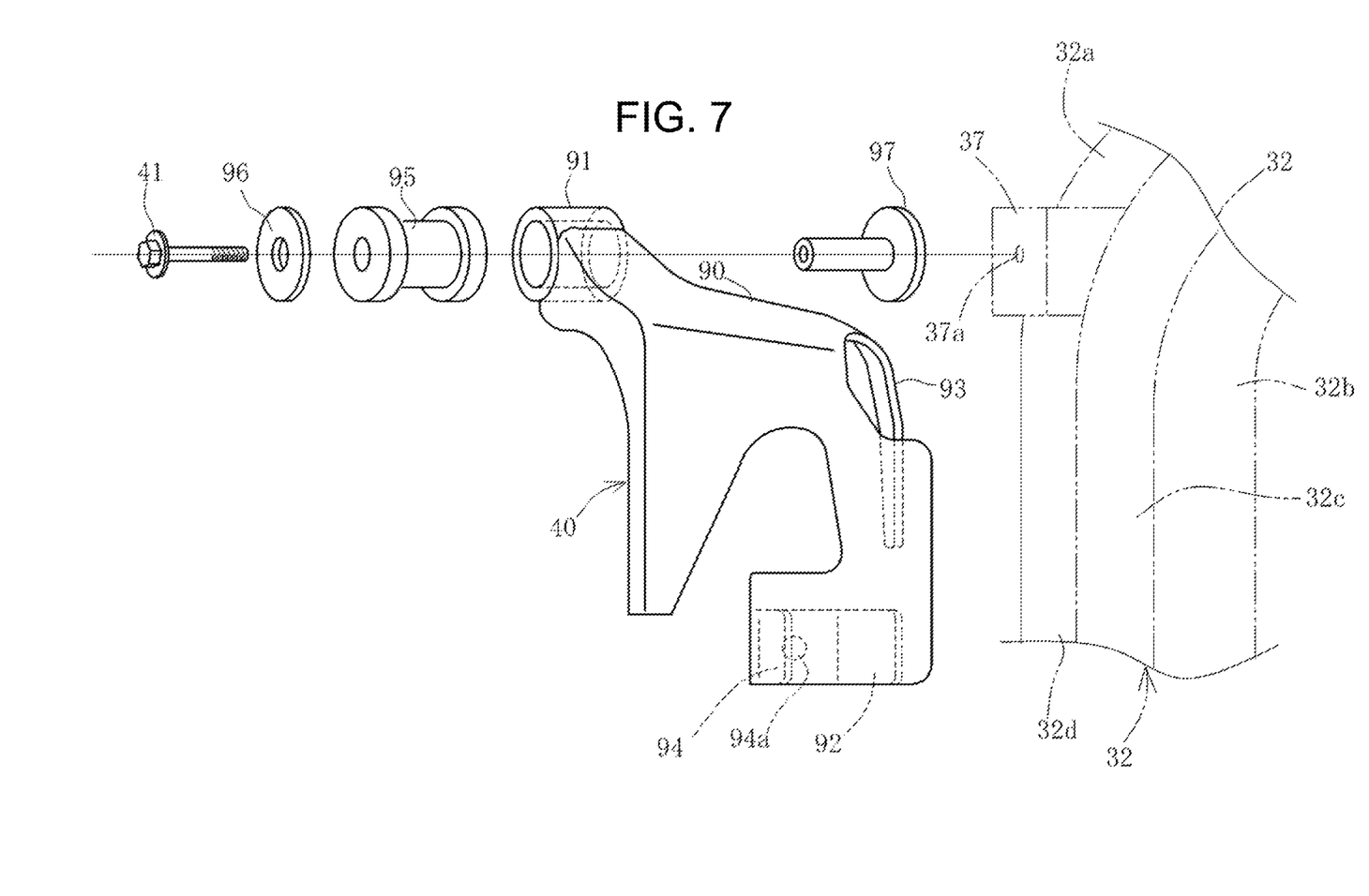
FIG. 7 is a perspective view of a tank front stay.
Figure 8:
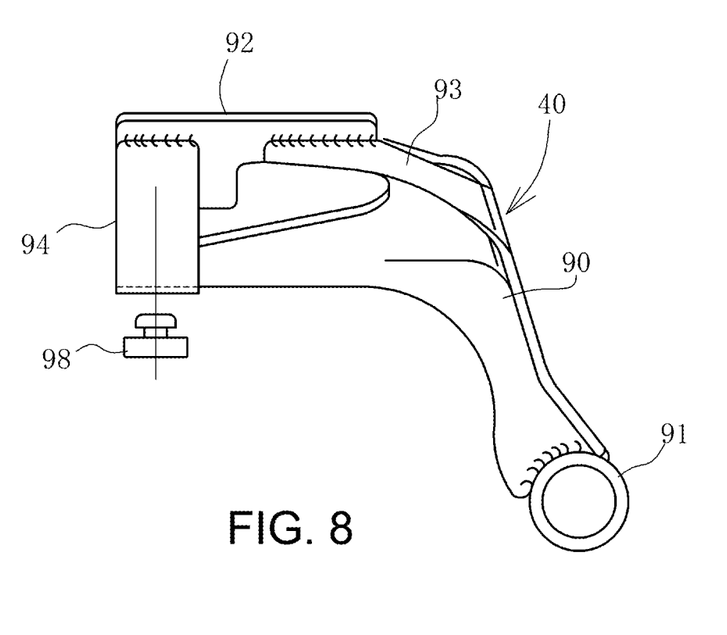
FIG. 8 is a side view of the tank front stay.
Figure 9:
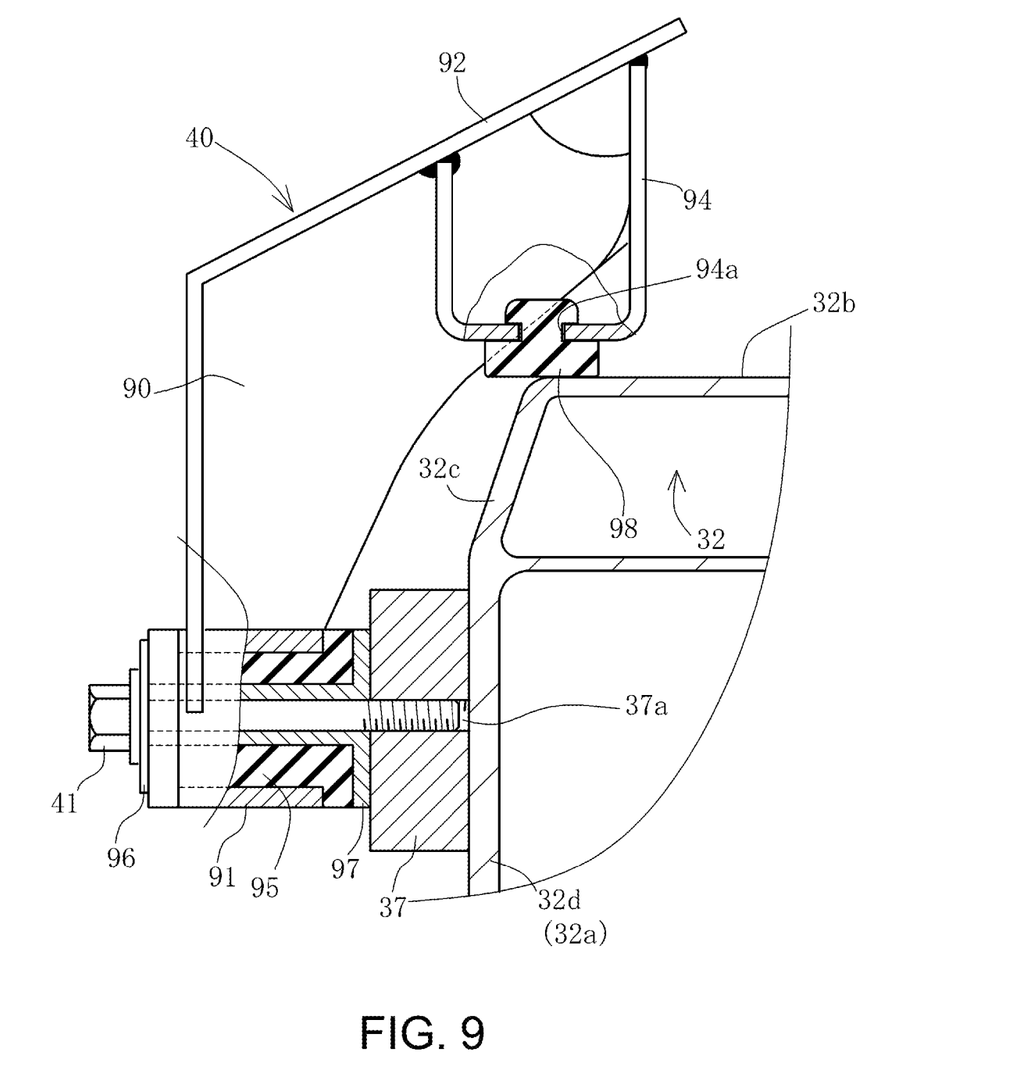
FIG. 9 is a view as viewed from a back side showing a state where the tank front stay is mounted on the vehicle body.

FIG. 7 to FIG. 9 show the tank front stay 40. FIG. 7 is a perspective view showing the left tank front stay 40 as viewed from an oblique upper side. FIG. 8 is a side view of the left tank front stay 40. FIG. 9 is a view as viewed from a back side showing a state where the tank front stay 40 is mounted on the vehicle body. The right tank front stay 40 is arranged in symmetry with the left tank front stay 40.

In these drawings, a sleeve portion 91 is welded to a distal end of an arm portion 90 made of sheet metal. The arm portion 90 is formed such that a contact surface 92, which is inclined along an inclined surface of the mounting seat 68, is integrally and continuously formed by bending. A rear end portion of a branched portion 93, which is bent and extends rearward from the arm portion 90, is welded to a lower surface of the contact surface 92.

A U-shaped bracket 94 is welded to the contact surface 92 of the arm portion 90.

As shown in FIG. 7, the sleeve portion 91 has a mounting hole 91*a* that penetrates the sleeve portion 91 and opens in the vehicle width direction. A cylindrical mount rubber 95 is inserted into the mounting hole 91*a*. A flanged collar 97 is inserted into an axis portion of the mount rubber 95. The bolt 41 is inserted into the collar 97 by way of a washer 96.

In FIG. 7, numeral 32*c* indicates a chamfered inclined shoulder portion formed on an upper outer side of the main frame 32. Numeral 32*d* indicates an approximately vertical side surface that is formed below the inclined shoulder portion 32*c*. The tank-front-side mounting boss 37 is welded to the front end bent portion 32*a*, which forms a front portion of the side surface 32*d*.

As shown in FIG. 9, the bracket 94 has a length in the vertical direction that is slightly smaller than a distance between the upper surface 32*b* of the main frame 32 and the mounting seat 68 (FIG. 6), which is formed when the fuel tank 15 is supported on the main frames 32. A mounting hole 94*a* is formed in a bottom portion of the bracket 94. A cushion rubber 98 (corresponding to a buffer member of the invention) is mounted on the bracket 94 by making use of the mounting hole 94*a*.

The cushion rubber 98 is configured such that the cushion rubber 98 is brought into contact with the upper surface 32*b* of the main frame 32 when the fuel tank 15 is arranged on the main frames 32 and the sleeve portions 91 are mounted on the tank-front-side mounting bosses 37.

As shown in FIG. 7, the mount rubber 95 and the flanged collar 97 are inserted into the sleeve portion 91, these parts are made to overlap with the tank-front-side mounting boss 37, the centers of respective holes are aligned with a nut 37*a* of the tank-front-side mounting boss 37, and the bolt 41 is made to pass through the collar 97 by way of the washer 96 and is fastened to the nut 37*a* of the tank-front-side mounting boss 37. Due to such a constitution, as shown in FIG. 9, the sleeve portion 91 is fastened to the tank-front-side mounting boss 37 from a lateral side of the vehicle body so that the tank front stay 40 is mounted on the front end bent portion 32*a* of the main frame 32 by way of rubber.

Next, the manner of operation of the embodiment is explained. As shown in FIG. 9, the cushion rubber (buffer member) 98, which is brought into contact with the upper surface 32*b* of the main frame 32, is arranged at a position where the cushion rubber 98 overlaps with the main frame 32 as viewed in a plan view of the tank front stay (connecting member) 40. The tank front stays (connecting member) 40 having a cushion rubber (buffer member) 98 is mounted on the inner member 66 at a position where the flange 67 extends outside the main frame 32. Due to such a constitution, unlike the prior art where the cushion rubber 98 is mounted on the flange 67, it is possible to mount the cushion rubber 98 independently from the flange 67. Accordingly, the restriction imposed on a shape of the tank and the mounting position of the cushion rubber 98 is eliminated.

Further, unlike the prior art, because it is unnecessary to form a hole in the flange 67 for mounting the cushion rubber 98, an adverse influence on the appearance of a vehicle can be prevented from being exerted, and it is unnecessary to additionally provide a cover in order to cover the mounting hole.

Further, the flange 67 projects more outward than the main frame 32 at a portion where the tank front stay 40 is mounted on the main frame 32. Hence, the cushion rubber 98 is arranged inside than the flange 67, eliminating the possibility that the cushion rubber 98 and the flange 67 interfere with each other, and thus facilitating the arrangement of the cushion rubber 98.

Further, the cushion rubber 98 is arranged more inside in the vehicle width direction than the mounting portion of the tank front stay 40, which is mounted on the main frame 32 and, hence, the cushion rubber 98 is arranged inside the flange 67 as well as inside the tank front stay 40. Therefore, the cushion rubber 98 is hardly observed from the outside, thus enhancing the appearance of the vehicle.

The mounting hole 91a, which opens in the vehicle width direction, is formed in the mounting portion of the tank front stay 40, which is mounted on the main frame 32, the mount rubber 95 is inserted into the mounting hole 91a, the flanged collar 97 is concentrically inserted into the mount rubber 95, and the bolt 41 is inserted into the flanged collar 97 by way of the washer 96 and is fastened to the tank-front-side mounting boss 37.

Due to such a constitution, the tank front stay 40 can be fastened to the vehicle body from sideward of the vehicle using the bolt 41. In such fastening, the tank front stay 40 is supported on the upper surface 32b of the main frame 32 by way of the cushion rubber 98 in advance and hence, there is no possibility that the fuel tank is 15 displaced downward at the time of fastening so that the fastening of the bolt 41 becomes difficult. As a result, the fastening operation can be easily performed from sideward of the vehicle and hence, operability can be enhanced.

As shown in FIG. 5 and FIG. 6, the recessed portion 69, which receives the key cylinder 30, is formed on the front end portion of the fuel tank 15 at the center in the vehicle width direction, and the tank front stays 40 are arranged on left and right sides of the recessed portion 69, respectively, and hence, the key cylinder 30 can be arranged at the front end portion of the fuel tank 15 at the center in the vehicle width direction.

In conventional mounting of the front portion of the fuel tank, the structure has been popularly adopted in many cases where a stay, which extends frontward at the center in the vehicle width direction, is mounted on a front portion of a fuel tank, and the stay is fastened to a portion of a head pipe in the vicinity of a rear portion of the head pipe. However, in such structure, an article such as a key cylinder cannot be arranged on the front end portion of the fuel tank at the center in the vehicle width direction. The front end portion of the fuel tank at the center in the vehicle width direction is a position that a rider in a seated state can easily observe, and is also a position that a rider's hand can easily reach.

To the contrary to the conventional mounting of the front portion of the fuel tank, according to this embodiment, the tank front stays 40 are arranged on left and right sides in a separated manner respectively, and are fastened to the main frame 32 in the lateral direction. Accordingly, the recessed portion 69 can be formed on the front end portion of the fuel tank 15 at the center in the vehicle width direction so that the key cylinder 30 can be arranged in the recessed portion 69.

As a result, the key cylinder 30 can be arranged at a position where a rider in a seated state can easily observe so that a key operation by the rider is facilitated whereby operability of the key is enhanced.

Particularly, the key operation by the rider is facilitated in the vehicle which is designed such that a rider is seated at a position close to a rear side of the vehicle as in the case of this embodiment. Accordingly, the invention is particularly advantageous when applied to the vehicle having such specification.

The invention is not limited to the above-mentioned embodiment, and various modifications and applications are conceivable within the principle of the invention. For example, the main frame may not be formed of a pair of left and right main frames, and one main frame may be arranged along the center of the vehicle body. However, the invention is particularly advantageous when applied to a vehicle where a main frame is formed of left and right main frames and a distance between the left and right main frames is large as in the case of the embodiment. The tank front stays 40 may be formed of a laterally extending integral body as in the case of the tank rear stay 50 without providing left and right separate tank front stays. However, also in this case, it is advantageous to provide the left and right separate tank front stays as in the case of the embodiment, since the recessed portion 69 for arranging the key cylinder 30 can be formed on an intermediate portion of the fuel tank 15 between the left and right tank front stays. The bolt 41 may be replaced with a fastening member of a different type.

DESCRIPTION OF REFERENCE NUMERALS

10: vehicle body frame
15: fuel tank
30: key cylinder
32: main frame
37: tank-front-side mounting boss
40: tank front stay
60: bottom surface
67: flange
68: mounting seat
90: arm portion
95: mount rubber
98: cushion rubber

What is claimed is:

1. A fuel tank mounting structure of a saddle-ride-type vehicle comprising: a vehicle body frame having a head pipe that steerably supports a front wheel and a main frame extending obliquely downward and rearward from the head pipe; an engine supported below the main frame; a fuel tank supported above the main frame; and a straddling-type seat arranged behind the fuel tank, wherein
the fuel tank includes a connecting member mounted on a front portion of the fuel tank in a state where the connecting member extends toward left and right outer side surfaces of the main frame from a bottom surface of the fuel tank,
the connecting member overlaps with the main frame as viewed in a top plan view, and a buffer member that is brought into contact with an upper surface of the main frame is arranged at a position where the connecting member and the main frame overlap with each other, and a flange portion extending along an outer peripheral portion of the fuel tank has at least a portion thereof arranged outside the main frame in the vehicle width direction as viewed in a top plan view, and the connecting member having the buffer member is mounted on the fuel tank where the flange extends outside the main frame.

2. The fuel tank mounting structure of a saddle-ride-type vehicle according to claim 1, wherein the fuel tank is formed by joining an outer member, which constitutes an outer surface, and an inner member, which constitutes the bottom surface, and the connecting member having the buffer member is mounted on the inner member where the flange extends outside the main frame.

3. The fuel tank mounting structure of a saddle-ride-type vehicle according to claim 1, wherein the buffer member is arranged more inside in the vehicle width direction than a mounting portion of the connecting member, which is mounted on the main frame.

4. The fuel tank mounting structure of a saddle-ride-type vehicle according to claim 1, wherein a mounting hole, which opens in the vehicle width direction, is formed in a mounting portion of the connecting member, which is mounted on the main frame, and the connecting member is fastened to the main frame by way of a mount rubber inserted into the mounting hole.

5. The fuel tank mounting structure of a saddle-ride-type vehicle according to claim 1, wherein a key cylinder that operates a main switch and a handle lock is provided above and behind the head pipe, a recessed portion, which stores the key cylinder, is formed at the center of a front end portion of the fuel tank in the vehicle width direction, and the connecting member is provided on left and right sides of the recessed portion.

6. The fuel tank mounting structure of a saddle-ride-type vehicle according to claim 2, wherein the buffer member is arranged more inside in the vehicle width direction than a mounting portion of the connecting member, which is mounted on the main frame.

7. The fuel tank mounting structure of a saddle-ride-type vehicle according to claim 2, wherein a mounting hole, which opens in the vehicle width direction, is formed in a mounting portion of the connecting member, which is mounted on the main frame, and the connecting member is fastened to the main frame by way of a mount rubber inserted into the mounting hole.

8. The fuel tank mounting structure of a saddle-ride-type vehicle according to claim 3, wherein a mounting hole, which opens in the vehicle width direction, is formed in a mounting portion of the connecting member, which is mounted on the main frame, and the connecting member is fastened to the main frame by way of a mount rubber inserted into the mounting hole.

9. The fuel tank mounting structure of a saddle-ride-type vehicle according to claim 2, wherein a key cylinder that operates a main switch and a handle lock is provided above and behind the head pipe, a recessed portion, which stores the key cylinder, is formed at the center of a front end portion of the fuel tank in the vehicle width direction, and the connecting member is provided on left and right sides of the recessed portion.

10. The fuel tank mounting structure of a saddle-ride-type vehicle according to claim 3, wherein a key cylinder that operates a main switch and a handle lock is provided above and behind the head pipe, a recessed portion, which stores the key cylinder, is formed at the center of a front end portion of the fuel tank in the vehicle width direction, and the connecting member is provided on left and right sides of the recessed portion.

11. The fuel tank mounting structure of a saddle-ride-type vehicle according to claim 4, wherein a key cylinder, that operates a main switch and a handle lock is provided above and behind the head pipe, a recessed portion, which stores the key cylinder, is formed at the center of a front end portion of the fuel tank in the vehicle width direction, and the connecting member is provided on left and right sides of the recessed portion.

12. A fuel tank mounting structure of a saddle-ride-type vehicle comprising: a vehicle body frame having a head pipe that steerably supports a front wheel and a main frame extending obliquely downward and rearward from the head pipe; an engine supported below the main frame; a fuel tank supported above the main frame; and a straddling-type seat arranged behind the fuel tank, wherein the fuel tank includes a connecting member mounted on the fuel tank in a state where the connecting member extends toward left and right outer side surfaces of the main frame from a bottom surface of the fuel tank, the connecting member overlaps with the main frame as viewed in a top plan view, and a buffer member that is brought into contact with an upper surface of the main frame is arranged at a position where the connecting member and the main frame overlap with each other, and wherein a key cylinder that operates a main switch and a handle lock is provided above and behind the head pipe, a recessed portion, which stores the key cylinder, is formed at the center of a front end portion of the fuel tank in the vehicle width direction, and the connecting member is provided on left and right sides of the recessed portion.

13. The fuel tank mounting structure of a saddle-ride-type vehicle according to claim 12, wherein the fuel tank is formed by joining an outer member, which constitutes an outer surface, and an inner member, which constitutes the bottom surface, to each other by a flange portion extending along an outer peripheral portion of the fuel tank, and the flange portion has at least a portion thereof arranged outside the main frame in the vehicle width direction as viewed in a top plan view, and the connecting member having the buffer member is mounted on the inner member where the flange extends outside the main frame.

14. The fuel tank mounting structure of a saddle-ride-type vehicle according to claim 12, wherein the buffer member is arranged more inside in the vehicle width direction than a mounting portion of the connecting member, which is mounted on the main frame.

15. The fuel tank mounting structure of a saddle-ride-type vehicle according to claim 12, wherein a mounting hole, which opens in the vehicle width direction, is formed in a mounting portion of the connecting member, which is mounted on the main frame, and the connecting member is fastened to the main frame by way of a mount rubber inserted into the mounting hole.

* * * * *